United States Patent Office 3,281,354
Patented Oct. 25, 1966

3,281,354
WELL-WORKING COMPOSITION
James B. Scott, Ponca City, Okla., and J Gilbert Davis II, Linch, Wyo., assignors to Continental Oil Company, Ponca City, Okla., a corporation of Delaware
No Drawing. Filed Mar. 7, 1960, Ser. No. 12,924
13 Claims. (Cl. 252—8.55)

This invention relates generally to improvements in the art of fracturing oil and gas wells, and more particularly, but not by way of limitation, to an improved well-working composition having a low fluid loss and the process of making and using such composition.

In the art of fracturing oil and gas wells, a special fluid composition (usually called fracturing fluid) is pumped down the well into contact with the formation to be fractured, and the pressure of the fluid composition is increased until the formation is fractured by hydraulic pressure. It is then usually desirable to incorporate a propping material, such as sand, in the fracturing fluid, whereby the propping material is carried into the fracture with the fracturing fluid. After the fracture has been extended to the extent desired, the pressure in the well bore is decreased and the fracturing fluid flows back into the well bore. At least a portion of the propping material is deposited in the fracture for maintaining the fracture open and enhancing the flow of formation fluids through the fracture into the well bore.

The extent of the fracture obtained is dependent primarily upon the penetrating characteristics of the fracturing fluid. Therefore, a primary concern in the art has been to reduce the penetrating characteristics (usually called the fluid loss) of fracturing fluids. Another consideration in the manufacture of fracturing fluids is viscosity. Some operators desire a high viscosity fracturing fluid, and others desire a low viscosity fracturing fluid. Therefore, it is highly desirable from an economical point of view that the same basic fracturing fluid can be readily adapted to either a high or low viscosity fluid.

Many attempts have been made to solve these problems of the art, and particularly the reduction of the fluid loss of fracturing fluids. A widely accepted fracturing fluid is disclosed in U.S. Patent 2,779,735 issued to Jack L. Brown and Mary M. Landers on January 29, 1957, which is specifically directed to an oil-base fracturing fluid. This patent teaches the concept of using a finely-divided oil-insoluble material having a substantial portion of its particles below 2 microns in size, and an agglutinant dispersant in an oil carrier to form a fracturing fluid. The agglutinant has only such strength as is necessary to cooperate with the small particles of the oil insoluble, finely-divided material to form a substantially fluid impervious seal on the face of a formation. Such a composition is very effective in fluid loss control, and the solids and agglutinants are used in quantities which are extremely small compared with the materials required by prior teachings in the art. However, the availability of any substantial amount of solid particles below 2 microns is limited, and the composition is usually prepared by a special spray or drum drying operation to obtain the desired particle sizes.

The present invention is directed to an aqueous base fracturing fluid and contemplates a novel well-working composition utilizing a minor amount of a soft and pliable sealing or plugging agent which is effective in providing a substantially impermeable seal on the face of a formation with a minor amount of water insoluble solids. More specifically, the present invention contemplates the combination of water insoluble solids and a secondary plugging agent in an aqueous carrier, wherein the secondary plugging agent cooperates with such solid particles to form an effective seal. The inclusion of nominal amounts of large particles does not inhibit the performance and the sources of supply of the aqueous insoluble solid material and facilitates dry blending of a fracturing fluid additive without the necessity of specially preparing the various components. A large variety of the strong secondary plugging agents may be used, and they are also normally readily available and economical. A well-working composition prepared in accordance with this invention has a relatively low viscosity which may be easily increased if the user so desires.

An important object of this invention is to provide an economical well-working, low fluid loss composition.

Another object of this invention is to provide a basic low fluid loss composition having a low viscosity, wherein the viscosity may be easily increased as desired.

A further object of this invention is to provide a low fluid loss composition containing only a minor amount of solid material.

A more general object of this invention is to facilitate and economize well-working operations.

Another specific object of this invention is to provide a low fluid loss composition comprising an aqueous carrier and only a minor amount of additive for reducing the fluid loss properties of the composition.

A still further object of this invention is to provide an additive for a fracturing fluid which may be dry blended without specially preparing any of the components of the additive.

Other objects and advantages of the invention will be evident as the description proceeds.

Broadly, the present invention is a low fluid loss additive for water comprising a primary and secondary plugging agent wherein the primary plugging agent is a finely-divided, water-insoluble solid and the secondary plugging agent is a soft, pliable, water-insoluble solid which may or may not have swelling properties in water.

In one aspect the invention is a low fluid loss composition comprising a large portion of water having dispersed therein a minor amount of water-insoluble, finely-divided solids to form a primary plugging agent and a sufficient amount of secondary plugging agent to reduce the fluid loss of the composition.

Another aspect of the present invention is the improvement in the fracturing of a subterranean formation with an aqueous medium under pressure which comprises sealing the formation traversed by a well bore against loss of appreciable amounts of the said aqueous medium to the formations by incorporating in said aqueous medium an additive containing a sufficient amount of finely-divided, water-insoluble solid particles, and a sufficient amount of a secondary plugging agent to reduce the fluid loss of the resulting composition, preferably to less than 50 cc. in 30 minutes when tested at 125° F. and a pressure differential of 1000 p.s.i.g. according to the recommended API test for fracturing fluids using additives, and contacting the faces of subsurface formations exposed to the well bore with said aqueous medium having said additive incorporated therein.

Before proceeding with specific examples illustrating our invention, it may be well to indicate in general the nature of the materials required.

WATER

The water which may be used as the carrier or vehicle in our improved fracturing fluid may be substantially any liquid water. For example, we may use water which is normally available in the vicinity of the well-working operation. In addition water from any other source may be used which can be made available by independent water well production, any naturally occurring surface water; or water transported to the site of the fracturing operation.

PRIMARY PLUGGING AGENT

In general, any finely-divided solid which will not go into solution to any appreciable extent in water during a period of time necessary for fracturing a well may be used in the composition of this invention. In this sense, the solid material may be considered substantially water insoluble and hard and nonpliable when dispersed in water. For example, we may use a material such as calcium carbonate, silica flour, calcium sulfate, carbon black, fuller's earth and similar products, magnesium or barium sulfate, Portland cement, sodium borate, sodium silicate, spent catalyst and walnut shells, oyster shell flour, fine sand, bone meal, cement fines, talc, crushed limestone, ground mica, fish meal, fly ash, and asbestos fines. These materials are readily available and all have desirable economic advantages.

The following Table I illustrates the particle size distribution for readily available solids which can be used as a primary plugging agent in a composition of this invention as determined by Stokes' law.

*Table I*

PERCENTAGE OF PARTICLES BELOW

|  | 100μ | 60μ | 40μ | 20μ | 10μ | 2μ |
|---|---|---|---|---|---|---|
| Crushed Limestone | 89.0 | 81.0 | 74 | 49.6 | 10.5 | 5 |
| Oyster Shell Flour | 92.5 | 90 | 85.5 | 55.8 | 11.9 | 5 |
| Barium Sulfate | 83 | 73 | 66.0 | 39.8 | 8 | 2 |
| Hydrated Lime | 100 | 96 | 94 | 65.0 | 46.7 | 12 |

SECONDARY PLUGGING AGENT

A great variety of secondary plugging agents may be used in the composition of this invention. As used herein and in the appended claims, the term "secondary plugging agent" may be defined as an insoluble material which, when dispersed in water is soft, pliable, and may or may not have swelling properties. It is either of such molecular or physical structure that portions of the molecules or particles will intermesh with portions of other similar molecules or particles to form a continuous film, or of such physical structure to deform into and seal the interstices between a layer of water-insoluble solid particles of about 20 microns. For example, we may use gum arabic, vegetable gum, starch, gum muscic, carboxy methyl cellulose, and bentonite.

One of the important considerations in the preparation of a fracturing fluid in accordance with this invention is the particle size of the primary plugging agent. We have found that when a strong secondary plugging agent, as defined above, is used, a minor portion of particles below about 20 microns is required. It will be understood, however, that all of the primary plugging agent need not be below 20 microns in size; and, in fact, we prefer a finely-divided solid also having an appreciable portion of larger particles, since such solids are more easily obtained.

The dry powder form of the low fluid loss additive of the present invention for utilization in water is made up of water-insoluble materials wherein about 20 to about 80 percent is a primary plugging agent of finely-divided solids, and about 80 to about 20 percent is a secondary plugging agent as defined above. The particle size of the primary plugging agent is critical in obtaining satisfactory fluid loss characteristics and it has been determined that there must be at least 0.003 pound of particles less than about 20 microns for each gallon of water in order to form a primary plugging agent.

The presence of amounts of primary plugging agent having a particle size of less than about 20 microns in excess of 0.003 pound per gallon of water is not critical to the fluid loss characteristics and the primary plugging agent could be composed completely of particles less than about 20 microns. As a practical matter, however, it would be uneconomical to make an effort to use only particles less than about 20 microns in light of the fluid loss advantages of the above figure of 0.003, but there is no maximum amount of such particles which are workable. The materials qualifying as primary plugging agents which are readily available normally have particle sizes in amounts such that it is advisable to provide a margin rather than the specific addition of only 0.003 pound less than 20 microns, so the preferable amount of primary plugging agent is one having between about 0.01 and about 0.02 pound per gallon of finely-divided solids less than 20 microns. The amount of particles less than 20 microns in size in the primary plugging agent is normally in the order of about 50 percent, but it can vary through a broad range, such as from about 30 to about 70 percent. The preferable range of amounts for particles under 20 microns set forth above avoids any disparity in the requisite amount of finely-divided solids, due to a variance in amounts of particles under 20 microns. The particle size distribution is not critical, except to the extent that the minimum amount under 20 microns must be satisfied.

The secondary plugging agent which is the remaining constituent of the fluid loss additive and in varying from about 80 to about 20 percent conversely to the primary plugging agent, must be present in an amount of at least .005 pound of secondary plugging agent for each gallon of water when 80 percent of the additive is composed of primary plugging agent. The preferable amount of secondary plugging agent is between about 0.03 and about 0.06 pound for each gallon of water, when used in conjunction with the preferable amounts of the primary plugging agent.

The preferable amounts of the primary and secondary plugging agents set forth above are not intended to be limits, but rather guides in using the invention of the present disclosure. It is further recommended that the amount of primary and secondary agents each be limited to about 0.2 pound per gallon of water in any application as a matter of economics and to take advantage of the value of the basic concept disclosed herein. The use of amounts of the individual agents in excess of 0.2 pound per gallon of water is unnecessary, which is a definite advantage over previous additives for preventing fluid loss, in that prior art discloses amounts up to 8 pounds per gallon were not uncommon.

In order that the present invention may be more readily understood, the following tables will be used to furnish examples of fluid loss additives contained with the scope of this invention. Table II, below, illustrates the fluid loss characteristics of the listed primary plugging agents, as described above, incorporated into an additive in conjunction with a single secondary plugging agent as described above.

The fluid loss tests were conducted in accordance with the revised API Code 29 Test Procedure for Fracturing Fluids Using Additives. Particularly, the mixed composition was placed in a filter cell and allowed to stand for 10 minutes to reach the desired temperature of 125° F., whereafter the cell was inverted and connected to a pressure reservoir having a pressure of 1000 p.s.i.g. with fluid loss being measured in cubic centimeters per 30 minutes.

Table II

| Primary Plugging Agent | Lb./gal. | Secondary Plugging Agent | Lb./gal. | Fluid Loss, cc./30 min |
|---|---|---|---|---|
| Hydrated Lime | 0.05 | Starch | 0.05 | 17.0 |
| Silica Flour | 0.05 | ......do...... | 0.05 | 21.0 |
| Fish Meal | 0.05 | ......do...... | 0.05 | 13.5 |
| Fly Ash | 0.05 | ......do...... | 0.05 | 40.0 |
| Oyster Shell Flour | 0.05 | ......do...... | 0.05 | 18.0 |

It will be noted in Table II that each of the primary plugging agents used is within the above definition; and since a fluid loss of 50 cc. in 30 minutes, when the test is run in accordance with the above-described procedure, is considered quite acceptable, each of the above primary plugging agents is within the prescribed specifications.

The following Table III illustrates the fluid loss characteristics of the listed secondary plugging agents, as described above, incorporated into an additive in conjunction with a single primary plugging agent as described above. The test procedure was in accordance with the above recommended API Code 29.

Table III

| Primary Plugging Agent | Lb./gal. | Secondary Plugging Agent | Lb./gal. | Fluid Loss, cc./30 min |
|---|---|---|---|---|
| Oyster Shell Flour | 0.04 | Starch | 0.06 | 18.0 |
| Oyster Shell Flour | 0.04 | Bentonite | 0.06 | 50.0 |
| Oyster Shell Flour | 0.04 | Carboxy Methyl Cellulose.[1] | 0.06 | 38.0 |
| Oyster Shell Flour | 0.04 | Carboxy Methyl Cellulose.[2] | 0.06 | 26.5 |
| Oyster Shell Flour | 0.04 | Guar Gum [3] | 0.06 | 26.5 |

[1] E. I. duPont Company—CMC.
[2] Wyandotte Chemical Corporation—Carbose MX.
[3] Stein, Hall and Company—Jaguar A-20.

It will be noted in Table III that each of the secondary plugging agents used is within the above definition; and since a fluid loss of 50 cc. in 30 minutes, when the test is run in accordance with the above procedure, is considered quite acceptable, each of the above secondary plugging agents is within the prescribed specifications.

Table IV, below, is a tabulation of the characteristics of the fluid loss composition comprised of the primary plugging agent, oyster shell flour, and the secondary plugging agent, starch, wherein the condition of temperature is varied for two formulations of the composition. The test procedure was in accordance with the above recommended API Code 29, except as to the condition of temperature.

Table IV

| Primary Plugging Agent, lb./gal. | Secondary Plugging Agent, lb./gal. | Total Conc., lb./gal. | Temp., °F. | Press., p.s.i. | Fluid Loss, cc./30 min |
|---|---|---|---|---|---|
| 0.0333 | 0.01667 | 0.05 | 75 | 1,000 | 19.7 |
| 0.0333 | 0.01667 | 0.05 | 100 | 1,000 | 23.0 |
| 0.0333 | 0.01667 | 0.05 | 125 | 1,000 | 27.9 |
| 0.0333 | 0.01667 | 0.05 | 150 | 1,000 | 30.5 |
| 0.0333 | 0.01667 | 0.05 | 200 | 1,000 | 52.0 |
| 0.0667 | 0.0333 | 0.10 | 75 | 1,000 | 8.0 |
| 0.0667 | 0.0333 | 0.10 | 100 | 1,000 | 14.9 |
| 0.0667 | 0.0333 | 0.10 | 125 | 1,000 | 18.3 |
| 0.0667 | 0.0333 | 0.10 | 150 | 1,000 | 22.5 |
| 0.0667 | 0.0333 | 0.10 | 200 | 1,000 | 53.0 |

The following Table V is a tabulation of the characteristics of the fluid loss composition comprised of the primary plugging agent, oyster shell flour, and the secondary plugging agent, starch, wherein the proportions of each are varied. The test procedure was in accordance with Revised API Code 29, with the temperature being 125° F. and the pressure being 1000 p.s.i.g.

Table V

| Primary Plugging Agent, lb./gal. | Secondary Plugging Agent, lb./gal. | Total Conc., lb./gal. | Fluid Loss, cc./30 min. |
|---|---|---|---|
| .006 | .006 | .012 | 55.0 |
| .00833 | .01667 | .025 | 37.0 |
| .006 | .024 | .03 | 28.2 |
| .01667 | .0333 | .05 | 22.0 |
| .0333 | .0667 | .10 | 16.0 |
| .0667 | .1333 | .20 | 8.5 |
| .1000 | .2000 | .30 | 7.0 |
| .01667 | .00833 | .025 | 39.0 |
| .024 | .006 | .03 | 59.7 |
| .0333 | .01667 | .05 | 24.0 |
| .0667 | .0333 | .10 | 20.5 |
| .1333 | .0667 | .20 | 10.0 |
| .2000 | .1000 | .30 | 8.5 |

From the foregoing, it will be apparent that the present invention provides an economical fracturing fluid. Both the primary and secondary plugging agents are readily available from a large number of sources of supply, as well as being economical. Also, each of the components of an additive formed in accordance with the present invention may be obtained in dry form to permit a dry blending of the additive, which is simple to perform and materially reduces the over-all cost of a fracturing operation. Furthermore, the extremely small amounts of primary and secondary plugging agents required to obtain a good fluid loss do not materially increase the viscosity of the water carrier, such that the basic fracturing fluid will have a relatively low viscosity which may be increased as desired by the user of the fluid.

Changes may be made in the combination, arrangement, and proportions of components, as well as the steps and procedures as heretofore set forth in the specification without departing from the spirit and scope of the invention as defined in the following claims.

We claim:

1. A low fluid loss, low viscosity fracturing composition consisting essentially of a major portion of water having dispersed therein an additive in an amount from about 0.015 to about 0.4 pound per gallon of said water, said additive consisting essentially of a primary plugging agent of finely divided substantially water insoluble solid particles selected from the group consisting of oyster shell flour, hydrated lime, fish meal and fly ash in an amount from 20 to 80 percent by weight of said additive with at least 0.003 pound per gallon of said particles having a particle size less than 20 microns, said particles being hard and nonpliable in water; and a secondary plugging agent selected from the group consisting of starch and bentonite having a substantially water insoluble, soft and pliable structure in water capable of sealing interstices between said primary plugging agent particles in an amount from 20 to 80 percent by weight of said additive.

2. A low fluid loss, low viscosity fracturing composition consisting essentially of a major portion of water having dispersed therein an additive in an amount from about 0.04 to about 0.08 pound per gallon of said water, said additive consisting essentially of a primary plugging agent of finely divided substantially water insoluble solid particles selected from the group consisting of oyster shell flour, hydrated lime, fish meal and fly ash in an amount from 20 to 80 percent by weight of said additive with at least 0.003 pound per gallon of said particles having a particle size less than 20 microns, said particles being hard and nonpliable in water; and a secondary plugging agent selected from the group consisting of starch and bentonite having a substantially water insoluble, soft and pliable structure in water capable of sealing interstices between said primary plugging agent particles in an amount from 20 to 80 percent by weight of said additive.

3. A low fluid loss, low viscosity fracturing fluid composition consisting of a major portion of water having dispersed therein an additive consisting essentially of a primary plugging agent of finely divided substantially water insoluble solid particles selected from the group consisting of oyster shell flour, hydrated lime, fish meal and fly ash in an amount from 0.003 to about 0.2 pound per gallon of water with at least 0.003 pound per gallon of said particles having a particle size less than 20 microns, said particles being hard and nonpliable in water; and a secondary plugging agent selected from the group consisting of starch and bentonite having a substantially water insoluble, soft and pliable structure in water capable of sealing interstices between said primary plugging agent particles in an amount from 0.005 to about 0.2 pound per gallon of water.

4. A low fluid loss, low viscosity fracturing fluid composition consisting of a major portion of water having dispersed therein an additive consisting essentially of a primary plugging agent of finely divided substantially water insoluble solid particles selected from the group consisting of oyster shell flour, hydrated lime, fish meal and fly ash in an amount from 0.003 to about 0.2 pound per gallon of water with at least 1.5 percent of said particles having a particle size less than 20 microns, said particles being hard and nonpliable in water; and a secondary plugging agent selected from the group consisting of starch and bentonite having a substantially water insoluble, soft and pliable structure in water capable of sealing interstices between said primary plugging agent particles in an amount from 0.005 to about 0.2 pound per gallon of water.

5. A low fluid loss, low viscosity fracturing fluid composition consisting of a major portion of water having dispersed therein an additive consisting essentially of a primary plugging agent of finely divided substantially water insoluble solid particles selected from the group consisting of oyster shell flour, hydrated lime, fish meal and fly ash in an amount from 0.02 to 0.04 pound per gallon of water with at least 0.003 pound per gallon of said particles having a particle size less than 20 microns, said particles being hard and nonpliable in water; and a secondary plugging agent selected from the group consisting of starch and bentonite having a substantially water insoluble, soft and pliable structure in water capable of sealing interstices between said primary plugging agent particles in an amount from 0.03 to 0.06 pound per gallon of water.

6. A low fluid loss, low viscosity fracturing fluid composition consisting of a major portion of water having dispersed therein an additive consisting essentially of a primary plugging agent of finely divided substantially water insoluble solid particles selected from the group consisting of oyster shell flour, hydrated lime, fish meal and fly ash in an amount from 0.02 to 0.04 pound per gallon of water with from 0.01 to 0.02 pound per gallon of said particles having a particle size less than 20 microns, said particles being hard and nonpliable in water; and a secondary plugging agent selected from the group consisting of starch and bentonite having a substantially water insoluble, soft and pliable structure in water capable of sealing interstices between said primary plugging agent particles in an amount from 0.03 to 0.06 pound per gallon of water.

7. A low fluid loss, low viscosity fracturing composition consisting essentially of a major portion of water having dispersed therein an additive in an amount from about 0.015 to about 0.4 pound per gallon of said water, said additive consisting essentially of a primary plugging agent of finely divided substantially water insoluble solid particles selected from the group consisting of oyster shell flour, hydrated lime, fish meal and fly ash wherein at least 0.003 pound per gallon of said particles having a particle size less than 20 microns, said particles being hard and nonpliable in water; and a secondary plugging agent selected from the group consisting of starch and bentonite having a substantially water insoluble, soft and pliable structure in water capable of sealing interstices between said primary plugging agent particles, said secondary plugging agent being incorporated in an amount sufficient to reduce the fluid loss of said composition to less than about 50 cc. in 30 minutes when tested at 125° F. and at a pressure of 1,000 p.s.i.g. in accordance with the recommended A.P.I. test for fracturing fluids using additives.

8. In a process of fracturing a subterranean formation traversed by a well bore wherein water is forced into the well bore under pressure, the method of sealing said formation against the loss of appreciable amounts of said water comprising dispersing in said water to make a low viscosity aqueous fracturing fluid an additive in an amount from about 0.015 to about 0.4 pound per gallon of said water, said additive consisting essentially of a primary plugging agent of finely divided substantially water insoluble solid particles selected from the group consisting of oyster shell flour, hydrated lime, fish meal and fly ash in an amount from 20 to 80 percent by weight of said additive with at least 0.003 pound per gallon of said particles having a particle size less than 20 microns, said particles being hard and nonpliable in water; and a secondary plugging agent selected from the group consisting of starch and bentonite having a substantially water insoluble, soft and pliable structure in water capable of sealing interstices between said primary plugging agent particles in an amount from 20 to 80 percent by weight of said additive, and contacting the face of said formation exposed to the well bore with said water having said additive incorporated therein.

9. In a process of fracturing a subterranean formation traversed by a well bore wherein water is forced into the well bore under pressure, the method of sealing said formation against the loss of appreciable amounts of said water comprising dispersing in said water to make a low viscosity aqueous fracturing fluid an additive in an amount from about 0.04 to about 0.08 pound per gallon of said water, said additive consisting essentially of a primary plugging agent of finely divided substantially water insoluble solid particles selected from the group consisting of oyster shell flour, hydrated lime, fish meal and fly ash in an amount from 20 to 80 percent by weight of said additive with at least 0.003 pound per gallon of said particles having a particle size less than 20 microns, said particles being hard and nonpliable in water; and a secondary plugging agent selected from the group consisting of starch and bentonite having a substantially water insoluble, soft and pliable structure in water capable of sealing interstices between said primary plugging agent particles in an amount from 20 to 80 percent by weight of said additive, and contacting the face of said formation exposed to the well bore with said water having said additive incorporated therein.

10. In a process of fracturing a subterranean formation traversed by a well bore wherein water is forced into the well bore under pressure, the method of sealing said formation against the loss of appreciable amounts of said water comprising dispersing in said water to make a low viscosity aqueous fracturing fluid an additive consisting essentially of a primary plugging agent of finely divided substantially water insoluble solid particles selected from the group consisting of oyster shell flour, hydrated lime, fish meal and fly ash in an amount from 0.003 to about 0.2 pound per gallon of water with at least 0.003 pound per gallon of said particles having a particle size less than 20 microns, said particles being hard and nonpliable in water; and a secondary plugging agent selected from the group consisting of starch and bentonite having a substantially water insoluble, soft and pliable structure in water capable of sealing interstices between said primary plugging agent particles in an amount from 0.005 to about 0.2 pound per gallon of water, and contacting the face of said formation exposed to the well bore with said water having said additive incorporated therein.

11. In a process of fracturing a subterranean formation traversed by a well bore wherein water is forced into the well bore under pressure, the method of sealing said formation against the loss of appreciable amounts of said water comprising dispersing in said water to make a low viscosity aqueous fracturing fluid an additive consisting essentially of a primary plugging agent of finely divided substantially water insoluble solid particles selected from the group consisting of oyster shell flour, hydrated lime, fish meal and fly ash in an amount from 0.02 to 0.04 pound per gallon of water with at least 0.003 pound per gallon of said particles having a particle size less than 20 microns; said particles being hard and nonpliable in water; and a secondary plugging agent selected from the group consisting of starch and bentonite having a substantially water insoluble, soft and pliable structure in water capable of sealing interstices between said primary plugging agent particles in an amount from 0.03 to 0.06 pound per gallon of water, and contacting the face of said formation exposed to the well bore with said water having said additive incorporated therein.

12. In a process of fracturing a subterranean formation traversed by a well bore wherein water is forced into the well bore under pressure, the method of sealing said formation against the loss of appreciable amounts of said water comprising dispersing in said water an additive consisting essentially of a primary plugging agent of finely divided substantially water insoluble solid particles selected from the group consisting of oyster shell flour, hydrated lime, fish meal and fly ash in an amount from 0.02 to 0.04 pound per gallon of water with from 0.01 to 0.02 pound per gallon of said particles having a particle size less than 20 microns, said particles being hard and nonpliable in water; and a secondary plugging agent selected from the group consisting of starch and bentonite having a substantially water insoluble, soft and pliable structure in water capable of sealing interstices between said primary plugging agent particles in an amount from 0.03 to 0.06 pound per gallon of water, and contacting the face of said formation exposed to the well bore with said water having said additive incorporated therein.

13. In a process of fracturing a subterranean formation traversed by a well bore wherein water is forced into the well bore under pressure, the method of sealing said formation against the loss of appreciable amounts of said water comprising dispersing in said water to make a low viscosity aqueous fracturing fluid an additive in an amount from about 0.015 to about 0.4 pound per gallon of said water, said additive consisting essentially of a primary plugging agent of finely divided substantially water insoluble solid particles selected from the group consisting of oyster shell flour, hydrated lime, fish meal and fly ash wherein at least 0.003 pound per gallon of said particles have a particle size less than 20 microns, said particles being hard and nonpliable in water; and a secondary plugging agent selected from the group consisting of starch and bentonite having a substantially water insoluble, soft and pliable structure in water capable of sealing interstices between said primary plugging agent particles, said secondary plugging agent being incorporated in an amount sufficient to reduce the fluid loss of said composition to less than about 50 cc. in 30 minutes when tested at 125° F. and at a pressure of 1,000 p.s.i.g. in accordance with the recommended A.P.I. test for fracturing fluids using additives, and contacting the face of said formation exposed to the well bore with said water having said additive incorporated therein.

References Cited by the Examiner

UNITED STATES PATENTS

| | | |
|---|---|---|
| 2,337,296 | 12/1943 | Kennedy et al. |
| 2,681,704 | 6/1954 | Menaul. |
| 2,779,735 | 1/1957 | Brown et al. |
| 2,793,996 | 5/1957 | Lummus. |
| 2,801,218 | 7/1957 | Menaul. |
| 2,811,207 | 10/1957 | Clark. |
| 2,908,597 | 10/1959 | Owen. |
| 3,042,612 | 7/1962 | Roebuck et al. |
| 3,153,450 | 10/1964 | Foster et al. |

OTHER REFERENCES

Rogers, Composition and Properties of Oil Well Drilling Fluids, first edition, published 1948 by Gulf Publishing Co., Houston, Texas, pages 172, 173, 360, 361, 363, 364, and 373.

Rogers, Composition and Properties of Oil Well Drilling Fluids, first edition, published 1948 by Gulf Pub. Co., Houston, Texas, pages 317, 320, 321, 322 and 323.

LEON D. ROSDOL, Primary Examiner.

JULIUS GREENWALD, JOSEPH R. LIBERMAN, Examiners.

H. B. GUYNN, Assistant Examiner.